Patented Jan. 7, 1941

2,227,709

UNITED STATES PATENT OFFICE 2,227,709

FORMALDEHYDE-UREA COMPOSITION

David E. Cordier, Toledo, Ohio, assignor to Plaskon Company, Incorporated, Toledo, Ohio, a corporation of Delaware No Drawing. Application June 11, 1940, Serial No. 339,910

5 Claims. (Cl. 260—71)

The invention relates to formaldehyde-urea compositions for hot pressing containing a latent accelerator or curing catalyst.

When a thermosetting molding composition, such as a formaldehyde-urea composition, is molded under elevated pressure and temperature, it first softens and then hardens at the molding temperature, whereas a thermoplastic composition remains soft until the molded article has cooled. As a result, an article molded from a thermosetting composition can be removed from the mold after a relatively short time and while the article is still hot, and an article molded from a thermoplastic composition cannot be removed from the mold until it has cooled and thus hardened sufficiently so that it can be handled.

The length of time for which a molding composition must be left in the mold is one of the factors that determines the cost of articles molded from the composition. A composition that must be left in the mold twice as long as another composition requires about twice as much molding equipment for the same volume of production, and hot-molding equipment is expensive.

Formaldehyde-urea molding compositions are thermosetting, but articles molded therefrom must be left in the heated mold for a short time after the article has become hard enough to be removed, in order that a resin of optimum properties may be produced. It has been found that curing the resin by keeping it at the molding temperature for the proper length of time is required to bring out its optimum properties. There is of course a demand for formaldehyde-urea molding compositions for which a relatively short period of curing is necessary.

A latent accelerator in a formaldehyde-urea molding composition is an ingredient that accelerates the curing of the composition without materially impairing its stability in storage at ordinary temperatures. True latent accelerators are very rare. They may be alkaline, neutral, or so slightly acid that they do not appreciably acidify a molding composition when added thereto. It is believed that they are substances that break up or undergo molecular rearrangement to form acids, but do not do so until the molding temperature is reached. The acids so formed must be strong enough to serve as catalysts that hasten the curing of the formaldehyde-urea resin.

Formaldehyde-urea molding compositions contain appreciable moisture, and are frequently kept in storage for weeks at a time before being used. Many substances that might be expected to decompose to form acids under molding conditions suffer the same decomposition within a few hours after being intimately mixed with a formaldehyde-urea composition, and are therefore not latent accelerators. Moreover, the behavior of a substance when present as a minor ingredient in a molding composition and subjected to molding pressures at the molding temperatures of 130° to 160° C. cannot be predicted from its behavior when subjected by itself to temperatures of 130° to 160° C. at atmospheric pressure. Most of the potentially acid substances that do not impair the stability of a molding composition when incorporated therewith likewise do not accelerate the curing of the composition in the mold.

A substance that materially impairs the stability of a molding composition is a highly undesirable ingredient. The manufacturer of a formaldehyde-urea molding composition must mold articles for various periods of time at various temperatures and pressures and carefully test them to determine the molding conditions and curing time required to give the desired results. If a molding composition contains an ingredient that materially impairs the stability of the composition, articles molded from the composition will be inferior, not only because the composition gradually deteriorates during storage, but also because the molding conditions required for producing articles with the desired properties from batches of the composition that have been stored for various periods under various conditions are indeterminate.

Although certain halogenated organic compounds that liberate hydrobromic and hydrochloric acid when heated have been known to act as latent accelerators when incorporated in formaldehyde-urea molding compositions, accelerators that liberate organic acids are preferable to accelerators that liberate strong inorganic acids. Certain organic peroxides, such as benzoyl peroxide, have been used heretofore as latent accelerators, but there are many organic pigments that cannot be used in a molding composition containing a peroxide.

The principal object of the invention is to provide formaldehyde-urea compositions for hot pressing containing novel latent accelerators. More specific objects and advantages are apparent from the description, which merely discloses and illustrates the invention and is not intended to impose limitations upon the claims.

A molding composition embodying the invention contains a latent accelerator selected from the group consisting of substances having the general formula $XYS_2O_3$, in which X is a metal selected from the group consisting of sodium, potassium, lithium, calcium, zinc, barium, strontium, cadmium and magnesium, and Y is a member of the group consisting of ethyl, propyl, butyl, amyl, benzyl, hydroxyethyl, hydroxypropyl, hydroxybutyl, and hydroxyamyl.

The preferred accelerators embodying the invention are sodium ethyl thiosulfate, sodium hydroxyethyl thiosulfate, sodium butyl thiosulfate, and sodium benzyl thiosulfate. Salts of any other metal, for example barium ethyl thiosulfate, calcium ethyl thiosulfate, barium benzyl thiosulfate, potassium ethyl thiosulfate, lithium ethyl thiosulfate, cadmium ethyl thiosulfate, magnesium ethyl thiosulfate, and zinc ethyl thiosulfate, may be employed if desired.

Some of these substances are slightly acid. However, when a slightly acid substance is added to a neutral formaldehyde-urea composition, a sufficient quantity of a base may be added so that the resulting molding composition is substantially neutral. Then, when the substantially neutral molding composition is subjected to heat and pressure in a mold, the composition is acidified because of the effect of the elevated temperature upon the latent accelerator, and such acidification accelerates the curing of the composition in the mold.

Zinc ethyl thiosulfate and cadmium ethyl thiosulfate can be obtained by the reaction of zinc thiosulfate or cadmium thiosulfate with ethyl bromide, evaporation of the reaction liquid, and fractional extraction of the ethyl thiosulfate from the residue by means of methanol, which dissolves the ethyl thiosulfate but does not readily dissolve cadmium bromide, zinc bromide, or the unreacted thiosulfate of the metal.

Lithium ethyl thiosulfate or magnesium ethyl thiosulfate can be obtained by treating sodium ethyl thiosulfate with lithium chloride or magnesium chloride in methanol solution, followed by filtering off the precipitated sodium chloride, which leaves the desired product in solution.

Sodium hydroxyethyl thiosulfate can be obtained by refluxing an aqueous solution of ethylene chlorhydrin and sodium thiosulfate, extracting the evaporated residue with methanol, and then evaporating the methanol extract.

Sodium ethyl thiosulfate is difficult to disperse throughout a molding composition in finely divided condition. It should therefore be ground as fine as possible before being mixed with a molding composition, and the mixture should then be ground for about 24 hours to secure satisfactory dispersion.

A formaldehyde-urea molding composition of the usual type, consisting primarily of cellulosic material (40 to 50%) and a formaldehyde-urea reaction product, may be employed.

*Example*

A dried formaldehyde-urea molding composition containing 70 parts of alpha-cellulose fiber impregnated with 100 parts of a formaldehyde-urea reaction product is ground in a ball mill together with 1 part of sodium benzyl thiosulfate. The customary modifiers, such as lubricants, opacifiers and coloring matter, may also be added to the ball mill. After an intimate mixture has been obtained in the form of a fine powder, it may be granulated or formed into pellets so that it can be used conveniently for charging molds. The molding is performed under a suitable pressure at a temperature of about 150° C.

In the foregoing example, sodium ethyl thiosulfate, sodium propyl thiosulfate, sodium butyl thiosulfate, sodium amyl thiosulfate, sodium hydroxyethyl thiosulfate, sodium hydroxypropyl thiosulfate, sodium hydroxybutyl thiosulfate, or sodium hydroxyamyl thiosulfate may be used instead of sodium benzyl thiosulfate. Moreover, instead of any of these substances, the corresponding potassium, lithium, calcium, strontium, barium, cadmium, magnesium, or zinc salt may be employed.

Various applications of the invention may be devised to meet various requirements.

This application is in part a continuation of application Ser. No. 224,360, Formaldehyde-urea molding compositions, filed by the present applicant on August 11, 1938.

Having described my invention, I claim:

1. A thermosetting composition for hot pressing comprising a formaldehyde-urea reaction product and a latent accelerator selected from the group consisting of substances having the general formula $XYS_2O_3$, in which X is a metal selected from the group consisting of sodium, potassium, lithium, calcium, barium, zinc, strontium, cadmium and magnesium, and Y is a member of the group consisting of ethyl, propyl, butyl, amyl, benzyl, hydroxyethyl, hydroxypropyl, hydroxybutyl, and hydroxyamyl.

2. A formaldehyde-urea composition for hot pressing comprising a formaldehyde-urea reaction product, cellulosic material, and a latent accelerator selected from the group consisting of substances having the general formula $XYS_2O_3$, in which X is a metal selected from the group consisting of sodium, potassium, lithium, zinc, calcium, barium, strontium, cadmium and magnesium, and Y is a member of the group consisting of ethyl, propyl, butyl, amyl, benzyl, hydroxyethyl, hydroxypropyl, hydroxybutyl, and hydroxyamyl.

3. A formaldehyde-urea composition for hot pressing comprising sodium ethyl thiosulfate as a latent accelerator.

4. A formaldehyde-urea composition for hot pressing comprising sodium butyl thiosulfate as a latent accelerator.

5. A formaldehyde-urea composition for hot pressing comprising sodium hydroxyethyl thiosulfate as a latent accelerator.

DAVID E. CORDIER.